(12) United States Patent
Koizumi et al.

(10) Patent No.: US 10,365,864 B2
(45) Date of Patent: Jul. 30, 2019

(54) INFORMATION PROCESSING SYSTEM AND OPERATION REDUNDANTIZING METHOD

(71) Applicant: HITACHI, LTD., Tokyo (JP)

(72) Inventors: Yuki Koizumi, Tokyo (JP); Shingo Maeda, Tokyo (JP); Tatsumi Matsuda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/081,473

(22) PCT Filed: Jun. 1, 2016

(86) PCT No.: PCT/JP2016/066308
§ 371 (c)(1),
(2) Date: Aug. 31, 2018

(87) PCT Pub. No.: WO2017/208409
PCT Pub. Date: Dec. 7, 2017

(65) Prior Publication Data
US 2019/0073163 A1    Mar. 7, 2019

(51) Int. Cl.
*G06F 3/12* (2006.01)
*G06F 11/14* (2006.01)
(Continued)

(52) U.S. Cl.
CPC ............ *G06F 3/121* (2013.01); *G06F 3/1234* (2013.01); *G06F 3/1273* (2013.01);
(Continued)

(58) Field of Classification Search
None
See application file for complete search history.

(56) References Cited

U.S. PATENT DOCUMENTS

| | | | | |
|---|---|---|---|---|
| 5,630,135 A | * | 5/1997 | Orimo | ............... G06F 11/1487 |
| | | | | 714/E11.008 |
| 2015/0113320 A1 | * | 4/2015 | Honma | ............... G06F 11/2023 |
| | | | | 714/13 |

FOREIGN PATENT DOCUMENTS

| | | |
|---|---|---|
| JP | 05-061700 A | 3/1993 |
| JP | 07-049844 A | 2/1995 |

(Continued)

OTHER PUBLICATIONS

International Search Report of PCT/JP2016/066308 dated Aug. 30, 2016.

*Primary Examiner* — Andrew H Lam
(74) *Attorney, Agent, or Firm* — Mattingly & Malur, PC

(57) ABSTRACT

An information processing system and operation redundantizing method are capable of preventing an operation from being adversely affected by any cause attributable to a malfunction after migration of the operation. First programs for each job step of each job for executing the operation in a system environment of a first computer, and second programs obtained by changing each first program in accordance with a system environment of a second computer to which the operation has been migrated, are stored in a storage apparatus. The second computer executes each job step of each job based on the second program; and if the second computer fails to execute a job step of any one of the jobs, the second computer issues a substitution instruction to the server apparatus to substitute for the second computer to execute the job step and the server apparatus executes the job step based on the first program.

8 Claims, 11 Drawing Sheets

(51) Int. Cl.
*G06F 11/20* (2006.01)
*G06F 11/22* (2006.01)

(52) U.S. Cl.
CPC ............ *G06F 3/1291* (2013.01); *G06F 11/14* (2013.01); *G06F 11/20* (2013.01); *G06F 11/22* (2013.01)

(56) References Cited

FOREIGN PATENT DOCUMENTS

| | | |
|---|---|---|
| JP | 10-083285 A | 3/1998 |
| JP | 2002-024042 A | 1/2002 |
| JP | 2005-157462 A | 6/2005 |

* cited by examiner

FIG. 6

Result Management Table

| # | Job Name | Job Step Name | Execution Date and Time | Open Return Code | Mainframe Cloud Return Code 26F | |
|---|---|---|---|---|---|---|
| | | | | | Single Step Substitution | Multiple-Step Substitution |
| 1 | JOB1 | STEP1 | 1/1 1:00 | 0 | — | — |
| 2 | JOB1 | STEP2 | 1/1 1:30 | 0 | — | — |
| 3 | JOB1 | STEP3 | 1/1 2:00 | 0 | — | — |
| 4 | JOB1 | STEP4 | 1/1 2:30 | 0 | — | — |

Achievement Management Table

| # | Job Name | Job Achievement | Number of Successive Successes |
|---|---|---|---|
| 1 | JOB1 | Insufficient | 9 Times |
| 2 | JOB2 | Sufficient | 10 Times |

Substitution Management Table

| # | Job Name | Job Step Name | Substitution Judgment | Number of Successive Substitution Failures |
|---|---|---|---|---|
| 1 | JOB1 | STEP1 | Non-target | 0 |
| 2 | JOB1 | STEP2 | Non-target | 0 |
| 3 | JOB1 | STEP3 | Target | 2 |
| 4 | JOB1 | STEP4 | Non-target | 0 |

28A  28B  28C  28D  28E

INFORMATION PROCESSING SYSTEM AND OPERATION REDUNDANTIZING METHOD

TECHNICAL FIELD

The present invention relates to an information processing system and an operation redundantizing method and is suited for use in, for example, an information processing system including an open system to which a batch operation has been migrated from a mainframe.

BACKGROUND ART

The mainframe is a large-scale computer system used as, for example, a business-critical system for companies and the like. Hardware and software which are used for the mainframe are often designed to be dedicated to that mainframe, so that the mainframe is highly reliable and has high throughput; however, the mainframe has the disadvantage of requiring considerable maintenance cost.

On the other hand, an open system is a computer apparatus constructed by combining general-purpose hardware and software; and although the operation system is inferior to the mainframe in terms of the reliability and the throughput, it has the advantage that it can be introduced and operated inexpensively. Therefore, in recent years, an increasing number of companies have been replacing their computer used in the business system from the mainframe to the open system for the purpose of cost reduction.

Such computer replacement work requires migration of an operation executed on the mainframe to the open system. Then, such operation migration work from the mainframe to the open system is performed by changing all programs for executing the operation to a format according to the open system, porting them to the open system, and then suspending the operation on the mainframe side once, and subsequently resuming the operation on the open system side.

CITATION LIST

Patent Literature

PTL 1: Japanese Patent Application Laid-Open Publication No. H05-61700

SUMMARY OF THE INVENTION

Technical Problem

Meanwhile, conventionally when a failure occurs during execution of the operation on the open system in the environment after the migration of the operation from the mainframe to the open system, the failure is dealt with by re-executing the program, in which the failure has occurred, on that open system (see PTL 1).

However, if the occurrence cause of the failure is an unsuccessful change of the program, the same failure will occur again even if that program is re-executed on the open system. Therefore, finally, the execution of the operation by the open system will have to be suspended and any defect in the program will have to be modified. During such correction of the defect, the operation will be suspended, thereby adversely affecting the operation.

The present invention was devised in consideration of the above-described circumstances and aims at proposing an information processing system and operation redundantizing method which are highly reliable and available and can effectively prevent the operation from being adversely affected by any cause attributable to a malfunction after the migration of the operation.

Solution to Problem

In order to solve the above-described problem, provided according to the present invention is an information processing system including: a second computer to which an operation composed of one or more jobs has been migrated from a first computer of a different system environment; a storage apparatus that stores first programs, each of which is for each job step of each of the jobs for executing the operation in the system environment of the first computer, and second programs, each of which is for each job step of each of the jobs and is obtained by changing each of the first programs in accordance with a system environment of the second computer; and a server apparatus capable of executing the operation in the system environment of the first computer by executing the first program, wherein the second computer executes each job step of each of the jobs based on each second program stored in the storage apparatus; and when the second computer fails to execute the job step of any one of the jobs, the second computer issues an substitution instruction to the server apparatus to substitute for the second computer to execute the job step; and wherein when the server apparatus receives, from the second computer, the substitution instruction to substitute for the second computer to execute the failed job step, the server apparatus substitutes for the second computer and executes the job step based on the first program corresponding to the job step stored in the storage apparatus.

Furthermore, provided according to the present invention is an operation redundantizing method executed by an information processing system, wherein the information processing system includes: a second computer to which an operation composed of one or more jobs has been migrated from a first computer of a different system environment; a storage apparatus that stores first programs, each of which is for each job step of each of the jobs for executing the operation in the system environment of the first computer, and second programs, each of which is for each job step of each of the jobs and is obtained by changing each of the first programs in accordance with a system environment of the second computer; and a server apparatus capable of executing the operation in the system environment of the first computer by executing the first program; and wherein the operation redundantizing method includes: a first step executed by the second computer executing each job step of each of the jobs based on each second program stored in the storage apparatus and, when the execution of the job step of any one of the jobs has failed, issuing an substitution instruction to the server apparatus to substitute for the second computer to execute the job step; and a second step executed by the server apparatus, when receiving, from the second computer, the substitution instruction to substitute for the second computer to execute the failed job step, substituting for the second computer and executing the job step based on the first program corresponding to the job step stored in the storage apparatus.

Regarding the information processing system and operation redundantizing method according to the present invention, even when a job step of a job which is being executed by the second computer cannot be performed due to, for example, a defect in the second program, the server apparatus substitutes for the second computer and performs that job step and, therefore, the suspension of the operation can be avoided effectively.

Advantageous Effects of the Invention

The information processing system and operation redundantizing method which are highly reliable and available and can effectively prevent the operation from being adversely affected by any cause attributable to the malfunction after the migration of the operation can be implemented according to the present invention.

BRIEF DESCRIPTION OF DRAWINGS

FIG. 6 is a conceptual diagram illustrating the structure of a result management table;

FIG. 7 is a conceptual diagram illustrating the structure of an achievement management table;

FIG. 8 is a conceptual diagram illustrating the structure of a substitution management table;

DESCRIPTION OF EMBODIMENTS

An embodiment of the present invention will be described below in detail with reference to the drawings.

(1) Configuration of Information Processing System According to This Embodiment

Figure 1:
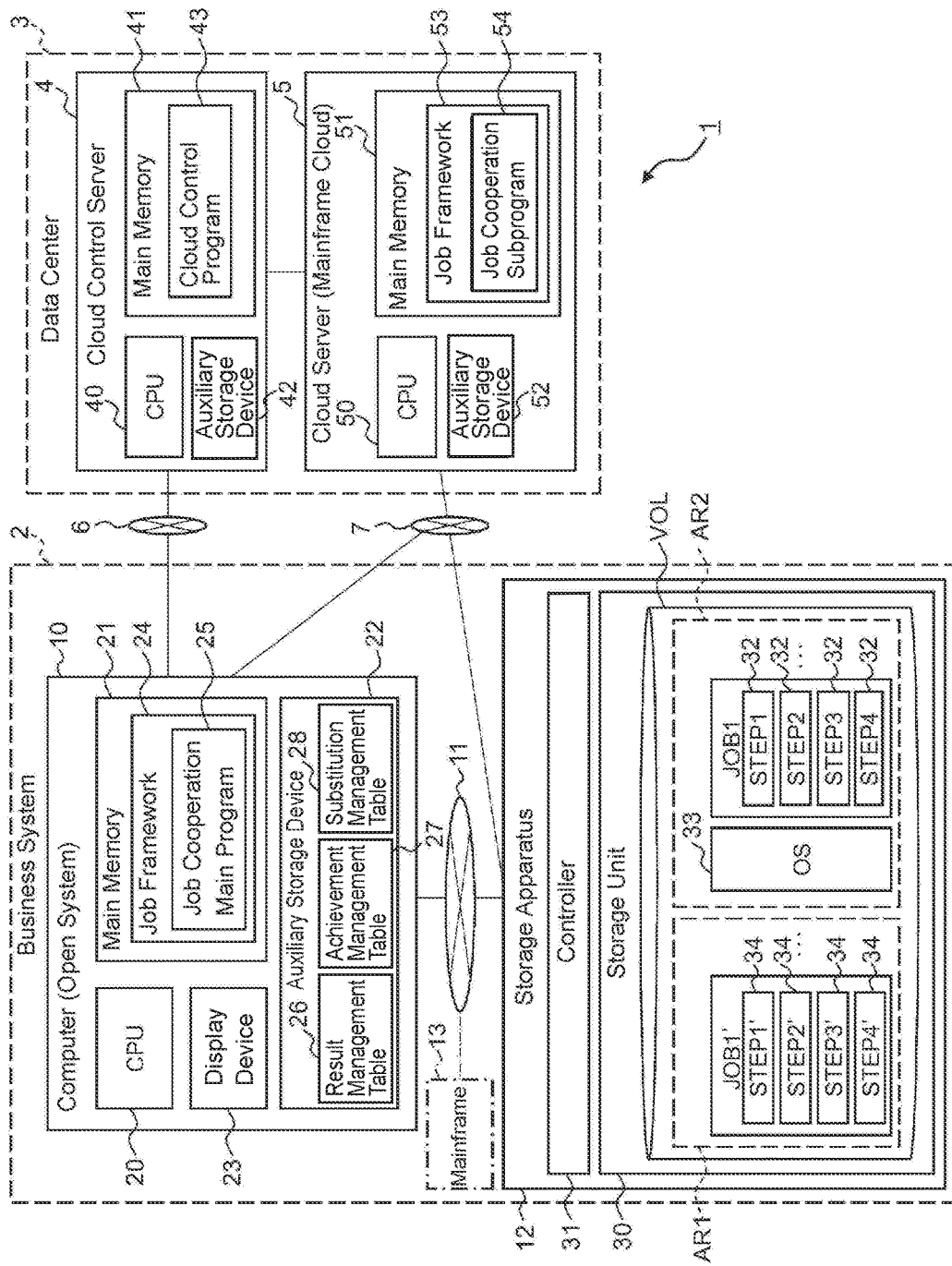
FIG. 1 is a block diagram illustrating the configuration of an information processing system according to this embodiment.

Referring to FIG. 1, 1 represents an information processing system according to this embodiment as a whole. This information processing system 1 is configured by including a business system 2 which is installed at a data center, a company, a government office, or the like, and a cloud control server 4 and a cloud server 5 which are installed at a data center 3.

The business system 2 includes a computer 10 composed of an open system and a storage apparatus 12 connected to the computer 10 via a first network 11. Incidentally, it is assumed in the following explanation that the computer 10 is in a state immediately after taking over an operation executed on a mainframe 13.

Figure 2:
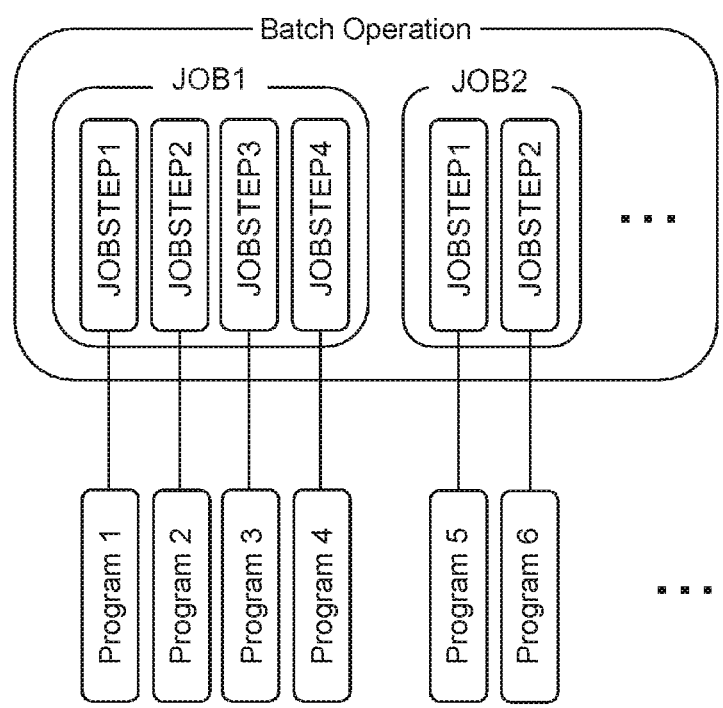
FIG. 2 is a conceptual diagram for explaining a batch operation.

Furthermore, it is assumed in the following explanation that the operation executed on the mainframe 13 is an operation executed by batch processing (hereinafter referred to as the "batch operation"). The batch operation is composed of a plurality of jobs (JOB1, JOB2, and so on) whose execution sequence is defined as illustrated in FIG. 2; and each job is composed of one or more job steps (JOBSTEP1, JOBSTEP2, and so on) whose execution sequence is defined. A "job" is a work unit in the batch operation and a "job step" is a work unit in one job. A job step is processed by executing one program which is associated with the relevant job step (program 1, program 2, and so on). Therefore, one job is processed by sequentially executing the programs, which are respectively associated with the respective job steps, in the sequential order of the corresponding job steps.

The computer 10 is configured by including information processing resources such as a CPU (Central Processing Unit) 20, a main memory 21, and an auxiliary storage device 22 as well as a display device 23. The CPU 20 is a processor that controls the operations of the entire computer 10. Furthermore, the main memory 21 is composed of, for example, a semiconductor memory and is used to store various kinds of programs and is also used as a work memory for the CPU 20. The auxiliary storage device 22 is composed of large-capacity, nonvolatile storage devices such as hard disk drives and SSDs (Solid State Drives) and is used to retain various kinds of data and programs for a long period of time. Furthermore, the display device 23 is used to display necessary information, a UI (User Interface), and so on and is composed of, for example, a liquid crystal display or an organic EL (Electroluminescence) display.

The computer 10 has a job framework 24 which is software mounted in the computer 10 for executing the batch operation which has been taken over from the mainframe 13; and, for example, when the computer 10 is activated, this job framework 24 is loaded from the auxiliary storage device 22 to the main memory 21. Then, the CPU 20 sequentially executes programs 34, which are for the respective job steps of each job for the batch operation and are stored in the storage apparatus 12 as described later, on the basis of this job framework 24, thereby executing the batch operation.

Furthermore, a job cooperation main program 25 is embedded in the job framework 24; and as the CPU 20 executes this job cooperation main program 25, various kinds of processing related to the batch operation redundantizing function according to this embodiment as described later is executed on the computer 10 side. The details of the job cooperation main program 25 will be described later.

The storage apparatus 12 is configured by including a storage unit 30 provided with one or more storage devices (not shown) and a controller 31 for controlling input/output of data to/from the storage unit 30. The storage devices of the storage unit 30 are composed of, for example, hard disk drives and SSDs (Solid State Drives). One or more storage devices are managed as one RAID (Redundant Arrays of Inexpensive Disks) group and a storage area(s) called one or more logical volumes is defined in a storage area provided by each of the storage devices constituting one RAID group.

In a case of this embodiment, a logical volume (hereinafter referred to as the "shared volume") VOL which is shared by the computer 10 and the cloud server 5 for the data center 3 and can be accessed by both the computer 10 and the cloud server 5 is defined within the storage apparatus 12.

A storage area of the shared volume VOL is managed by dividing it into a first area AR1 allocated to the computer 10 and a second area AR2 allocated to the cloud server 5.

Then, the second area AR2 stores programs 32, each of which is created in a mainframe format for executing the batch operation and is for each job step (JOBSTEP1, JOBSTEP2, and so on) of each job (JOB1, JOB2, and so on), and an OS (Operating System) 33 for the mainframe. Furthermore, the first area AR1 stores programs 34, each of which is obtained by changing the format of the relevant program 32 for each job step of each job for the mainframe into an open system format in order to execute the batch operation, which has been taken over from the mainframe 13, on the computer 10 and is for each job step (JOBSTEP1', JOBSTEP2', and so on) of each job (JOB1', JOB2', and so on).

The cloud control server 4 is composed of a general-purpose server apparatus equipped with information processing resources such as a CPU 40, a main memory 41, and an auxiliary storage device 42 and is connected via a network 6 to the computer 10 for the business system 2. Since functions, configurations, etc. of the CPU 40, the main memory 41, and the auxiliary storage device 42 are basically similar to those of the CPU 20, the main memory 21, and the auxiliary storage device 22 for the computer 10, an explanation about them is omitted here.

The main memory 41 for the cloud control server 4 stores a cloud control program 43. The CPU 40 can activate, or suspend the activation of, the cloud server 5 by controlling the cloud server 5 in accordance with an instruction issued from the computer 10 on the basis of this cloud control program 43 and can make the cloud server 5 function as the mainframe by causing the OS 33 stored in the second area AR2 of the shared volume VOL to be read and activated by the cloud server 5.

The cloud server 5 is also composed of a general-purpose server apparatus equipped with information processing resources such as a CPU 50, a main memory 51, and an auxiliary storage device 52 and is connected via a network 7 to the computer 10 and the storage apparatus 12 for the business system 2, respectively. Since functions, configurations, etc. of the CPU 50, the main memory 51, and the auxiliary storage device 52 are basically similar to those of the CPU 20, the main memory 21, and the auxiliary storage device 22 for the computer 10, an explanation about them is omitted here.

The cloud server 5 also has a job framework 53 mounted therein, which is similar to that of the computer 10; and the CPU 50 reads and activates the OS 33 from the second area AR2 of the shared volume VOL and then executes the programs 32 stored in the second area AR2 of the shared volume VOL on the basis of the job framework 53, thereby being capable of executing the job steps corresponding to the programs 32.

Furthermore, a job cooperation subprogram 54 is embedded in the job framework 53 mounted in the cloud server 5; and as the CPU 50 executes this job cooperation subprogram 54, various kinds of processing related to the batch operation redundantizing function according to this embodiment as described later is executed on the cloud server 5 side. The details of the job cooperation subprogram 54 will be described later.

(2) Batch Operation Redundantizing Function in Information Processing System (2-1) Outline of Batch Operation Redundantizing Function Next, the batch operation redundantizing function in this information processing system 1 will be described.

In general, when the batch operation executed on the mainframe is to be migrated to the open system, it is necessary to change each program, which is associated with each job step in that batch operation, to the format according to the open system. However, if there is any defect in the changed program, a failure occurs when the job step corresponding to that program is executed on the open system.

Conventionally, when such a failure has occurred, the open system re-executes that job step. However, if the program itself, whose format has been changed from the mainframe format to the open system format, has the defect, the same failure will occur even if that job step is re-executed on the open system.

Therefore, with the information processing system 1 according to this embodiment, when the computer 10 which has taken over the operation from the mainframe 13 fails to execute any one of the job steps, it issues an instruction to the cloud server 5 to substitute for the computer 10 to execute that job step (hereinafter referred to as the "failed job step") and the cloud server 5 executes the failed job step according to this instruction in accordance with the program 32 for the mainframe before the change, which is stored in the second area AR2 of the shared volume VOL.

However, if the failed job step is processed by utilizing the execution result of an immediately preceding job step and a failure has occurred at the stage of any one of prior job steps before the failed job step, the same failure would occur even if only the failed job step were executed by the cloud server 5 serving as the substitute.

So, the information processing system 1 according to this embodiment is designed so that if the failed job step fails even when it is executed by the cloud server 5 serving as the substitute, the cloud server 5 substitutes for the computer 10 and executes each job step of the relevant job including the failed job step (a job which is currently being executed and hereinafter referred to as the "running job") from its first job step to the failed job step.

In addition, the information processing system 1 according to this embodiment is designed so that the cloud server 5: compares the execution result (output data) of each job step, which is obtained as described above as a result of the execution of each job step from the first job step to the failed job step of the running job, with the execution result (output data) of each job step which is obtained when these job steps were executed by the computer 10 as described earlier; identifies a job step which outputs unreasonable data on the basis of the comparison result; and presents the identified result to a user.

However, even when the cloud server 5 serving as the substitute executes each job step of the running job from its first job step to the failed job step, if the cloud server 5 fails to execute the running job successively as many times as a preset number of times (hereinafter referred to as the "threshold value for the number of successive cloud failures"), the computer 10 displays an error message to that effect on the display device 23 (FIG. 1), thereby giving a warning to the user.

Figure 3:
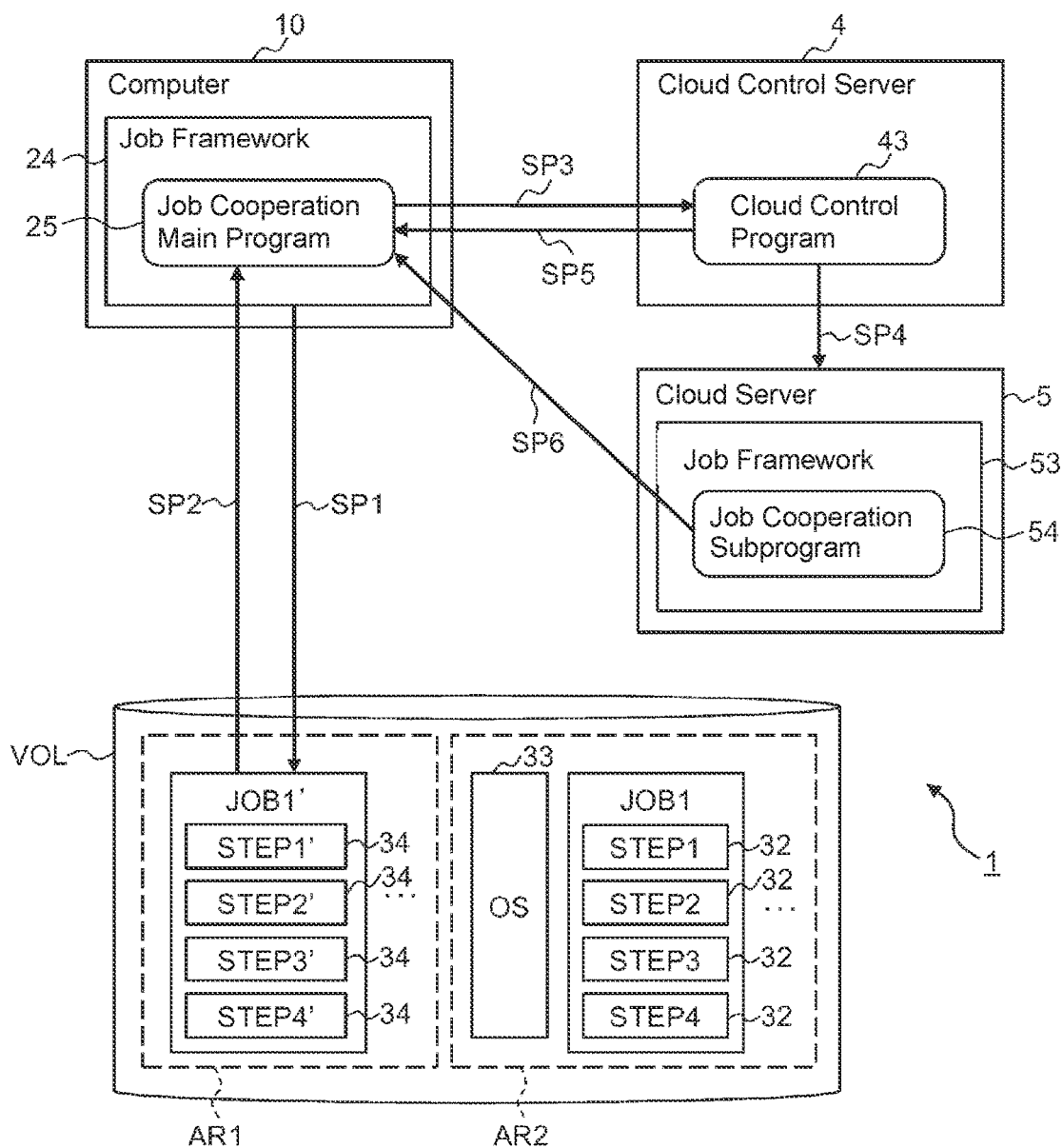
FIG. 3 is a block diagram for explaining a batch operation redundantizing function according to this embodiment.
Figure 4:
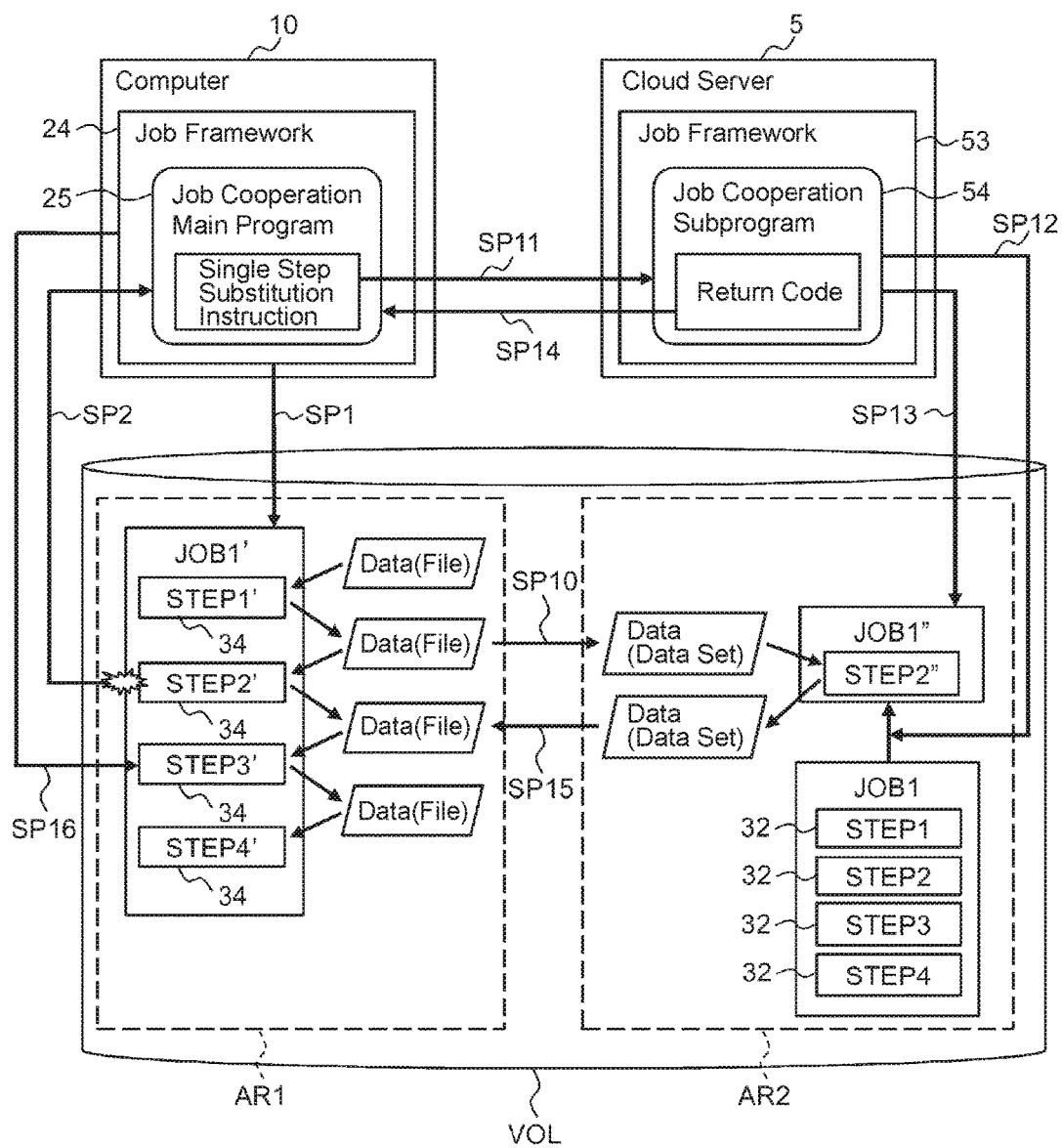
FIG. 4 is a block diagram for explaining the batch operation redundantizing function according to this embodiment.
Figure 5:
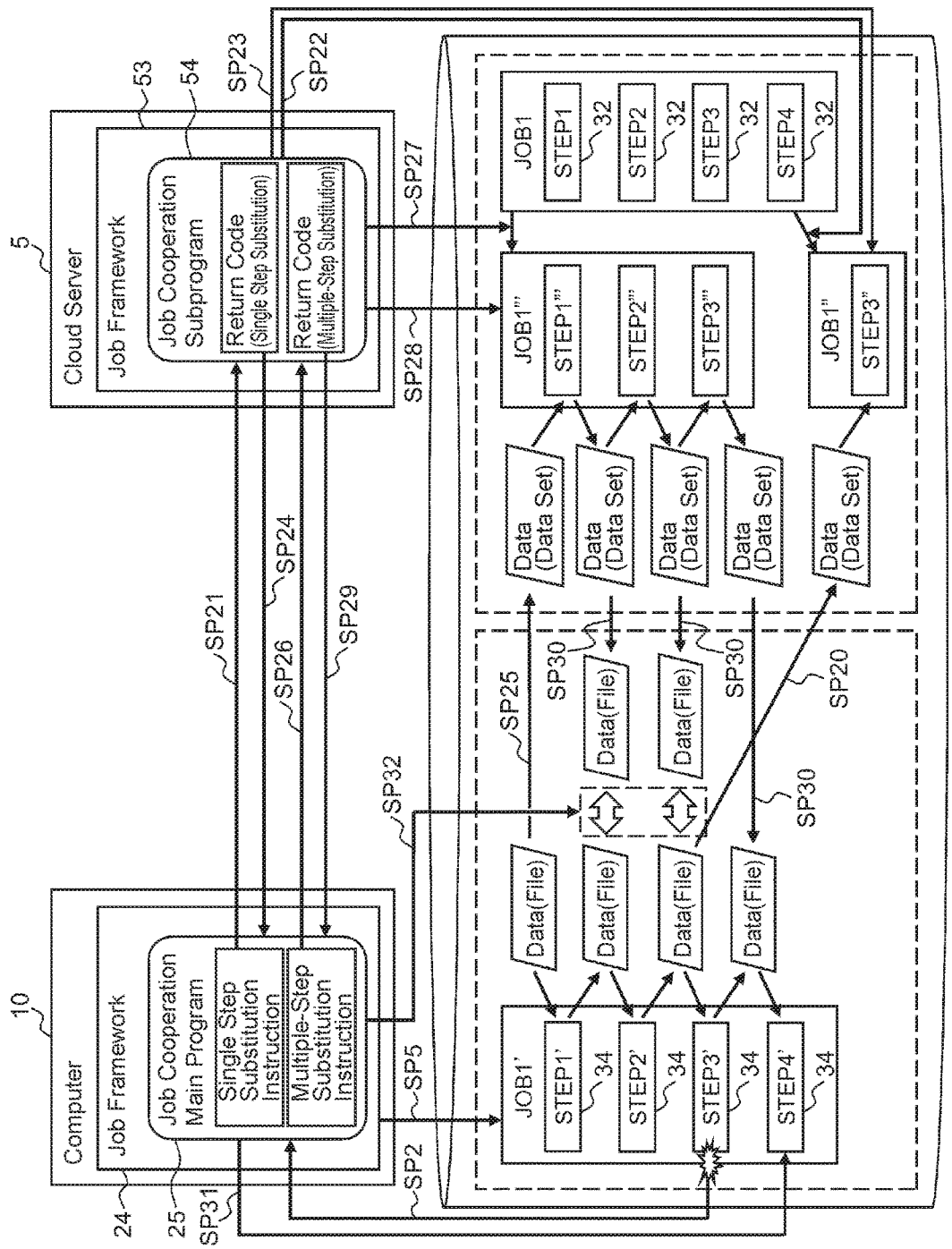
FIG. 5 is a block diagram for explaining the batch operation redundantizing function according to this embodiment.

FIG. 3 to FIG. 5 illustrate flows of processing sequences executed by the information processing system 1 in relation to the batch operation redundantizing function according to this embodiment. Incidentally, in the following explanation, a processing subject of various kinds of processing may be sometimes described as "software" or a "program"; however, it is needless to say that practically, the CPU 20, 40, or 50 for the relevant apparatus (the computer 10, the cloud control server 4, or the cloud server 5) executes the processing according to that software or program.

Firstly, FIG. 3 will be explained. FIG. 3 illustrates a flow executed when the computer 10 has failed to execute a job step and until the cloud server 5 is activated by the computer 10 in order to give the instruction to the cloud server 5 to serve as the substitute to execute the relevant job step (failed job step).

The job framework 24 for the computer 10 executes the batch operation, which has been taken over from the mainframe 13, by sequentially executing the programs 34 which are for the respective job steps of each job and which have been changed for the open system and are stored in the first area AR1 of the shared volume VOL in the storage apparatus 12 (SP1).

Then, every time one job step is completed, a return code representing whether the relevant job step has been executed successfully or not (whether a success or a failure) is transmitted from the program 34 to the job cooperation main program 25 embedded in the job framework 24 (SP2). In the following explanation, the value of the return code is set as: "0" when that job step has been executed successfully; and "4" when that job step has failed.

The job cooperation main program 25 monitors the value of the return code which is given as described above every time the job framework 24 executes a job step; and when the value of the return code for any one of the job steps is "4" (that is, when the job step has failed), the job cooperation main program 25 transmits a cloud activation request to the cloud control program 43 for the cloud control server 4 to demand, for example, the activation of the cloud server 5 (SP3).

After receiving such a cloud activation request, the cloud control program 43 activates the relevant cloud server 5 by applying the power to the cloud server 5 and also causes the cloud server 5 to read and activate the mainframe OS 33 which is stored in the second area AR2 of the shared volume VOL (SP4). Then, the cloud control program 43 transmits a first completion notice to the job cooperation main program 25 for the computer 10 to report that the activation of the cloud server 5 has been completed (SP5).

Furthermore, when the job framework 53 for the cloud server 5 activated by the cloud control program 43 enters a state capable of executing each job step of each job of the batch operation according to the programs 32 stored in the second area AR2 of the shared volume VOL, the job cooperation subprogram 54 for the cloud server 5 transmits a second completion notice to the job cooperation main program 25 for the computer 10 to report that the activation of the cloud server 5 has been completed (SP6).

On the other hand, FIG. 4 illustrates a flow executed after the job cooperation main program 25 for the computer 10 activates the cloud server 5 as described above and then issues an instruction to the cloud server 5 to substitute for the computer 10 to execute the failed job step and until the cloud server 5 which has received this instruction executes the failed job step.

After receiving both the first and second completion notices described earlier with respect to step SP5 and step SP6 in FIG. 3, the job cooperation main program 25 reads the output data of a job step immediately before the failed job step from the first area AR1 of the shared volume VOL, converts this into data of the mainframe format, and stores it at a specified position of the second area AR2 of the shared volume VOL (SP10).

Furthermore, subsequently, the job cooperation main program 25 transmits an instruction, including a job step name of the failed job step and a job name of the job (running job) which includes the failed job step and is currently being executed, to the job cooperation subprogram 54 for the cloud server 5 to serve as the substitute and execute the failed job step (hereinafter referred to as the "single step substitution instruction") (SP11).

After receiving the single step substitution instruction, the job cooperation subprogram 54 extracts the program 32 for the job step (the failed job step) designated by the single step substitution instruction from among the programs 32 for the respective job steps of each job stored in the second area AR2 of the shared volume VOL and creates a job definition of a job (JOB1") for executing that job step (the failed job step) (SP12).

Furthermore, the job cooperation subprogram 54 issues an instruction to the job framework 53 to execute the created job definition (SP13). Accordingly, the job framework 53 which has received such an instruction executes the job step, regarding which the instruction to serve as the substitute and execute it is given (that is, the failed job step), by executing the job based on that job definition by using the output data stored in the second area AR2 of the shared volume VOL in step SP10.

Furthermore, when the job framework 53 executes the failed job step successfully, the job cooperation subprogram 54 transfers the return code (the return code whose value is set to "0"), which is then given from the corresponding program 32, to the job cooperation main program 25 for the computer 10 (SP14).

When the job cooperation main program 25 receives the above-described return code which has been transferred from the job cooperation subprogram 54, it reads the output data of the failed job step executed by the cloud server 5 in step SP13 from the second area AR2 of the shared volume VOL, converts it into the open system format, and then stores it at a specified position in the first area AR1 of the shared volume VOL (SP15).

Furthermore, the job cooperation main program 25 then issues an instruction to the job framework 24 for the computer 10 to resume the running job. Accordingly, the job framework 24 which has received this instruction resumes executing the failed job step and subsequent job steps of the running job by using the output data which are obtained as a result of the execution of the failed job step by the cloud server 5 serving as the substitute and are stored in the first area AR1 of the shared volume VOL by the job cooperation main program 25 in step SP15 (SP16).

On the other hand, FIG. 5 illustrates a flow executed after the job cooperation main program 25 for the computer 10 activates the cloud server 5 as described above and then transmits the single step substitution instruction to the cloud server 5 to serve as the substitute and execute the failed job step and when the cloud server 5 which has received this single step substitution instruction executes the failed job step, but the cloud server 5 also fails to execute the failed job step.

In this case, the flow from step SP20 to step SP24 is similar to the flow from step SP10 to step SP14 described above with reference to FIG. 4. However, in this example, the cloud server 5 which has received the single step substitution instruction targeted at the failed job step from the job cooperation main program 25 fails to execute the failed job step, so that the value of the return code transmitted from the job cooperation subprogram 54 to the job cooperation main program 25 in step SP24 is set to a value indicating the failure ("4").

The job cooperation main program 25 which has received this return code converts input data of the first job step of the running job into the mainframe format and stores this at a specified position in the second area AR2 of the shared volume VOL (SP25).

Furthermore, the job cooperation main program 25 transmits an instruction to the job cooperation subprogram 54 for the cloud server 5 to sequentially execute the respective job steps of the running job from the first job step to the failed job step (hereinafter referred to as the "multiple-step substitution instruction") by designating the job name of the running job and the job step name of the failed job step of the running job (SP26).

After receiving the multiple-step substitution instruction, the job cooperation subprogram 54 extracts the programs 32 of the respective job steps from the first job step to the failed job step of the running job, which are stored in the second area AR2 of the shared volume VOL, and creates a job definition of a job (JOB1''') for sequentially executing these job steps (SP27).

Furthermore, the job cooperation subprogram 54 causes the job framework 53 to execute the created job definition (SP28). Accordingly, the job framework 53 sequentially executes the respective job steps of the running job from the first job step to the failed job step by executing the job based on that job definition by using the input data stored in the second area AR2 of the shared volume VOL in step SP25.

Furthermore, when the job framework 53 successfully executes all the respective job steps of the running job from the first job step to the failed job step, the job cooperation subprogram 54 transmits a return code to that effect (the return code whose value is set to "0") to the job cooperation main program 25 for the computer 10 (SP29).

After receiving the return code in step SP29 from the job cooperation subprogram 54, the job cooperation main program 25 converts output data of these job steps, which are obtained by executing the respective job steps of the running job from the first job step to the failed job step in step SP28, into the open system format respectively and stores these pieces of output data respectively at specified positions in the first area AR1 of the shared volume VOL (SP30).

Furthermore, the job cooperation main program 25 then issues an instruction to the job framework 24 for the computer 10 to resume the running job. Accordingly, the job framework 24 which has received this instruction resumes executing the failed job step and subsequent job steps by using the output data which are obtained as a result of the execution of the failed job step by the cloud server 5 serving as the substitute and are stored in the first area AR1 of the shared volume VOL by the job cooperation main program 25 in step SP30 (SP31).

In parallel with the above-described processing, the job cooperation main program 25 identifies a job step which has any defect (hereinafter referred to as the "defective job step") by comparing the output data of each job step, which is stored in the first area AR1 of the shared volume VOL and is obtained as a result of the execution of each job step of the running job from the first job step to the failed job step by the computer 10, with the output data of each job step which is stored in the first area AR1 of the shared volume VOL in step SP30 and is obtained as a result of the execution of these job steps by the cloud server 5 (SP32).

Specifically speaking, the job cooperation main program 25 identifies a job step regarding which the value of the output data obtained as a result of the execution of the corresponding program 34 in the changed open system format by the job framework 24 for the computer 10 as described above is different from the value of the output data obtained as a result of the execution of the corresponding program 32 in the mainframe format by the cloud server 5, as the defective job step.

Then, the job cooperation main program 25 causes the display device 23 to display an error message about the thus-identified job step, indicating that there is a possibility of a problem in the program 34 of the relevant job step, which has been changed to the open system format.

(2-2) Structures of Various Kinds of Tables

The auxiliary storage device 22 for the computer 10 stores a result management table 26, an achievement management table 27, and a substitution management table 28 as illustrated in FIG. 1 as means for implementing the batch operation redundantizing function according to this embodiment described above.

The result management table 26 is a table used by the job framework 24 for the computer 10 to manage logs of the execution results of the respective job steps executed before then; and is composed of a number column 26A, a job name column 26B, a job step name column 26C, an execution date and time column 26D, an open return code column 26E, and a mainframe cloud return code column 26F as illustrated in FIG. 6.

Then, the number column 26A stores a serial number assigned to each record of each log registered in the result management table 26. Furthermore, the job step name column 26C stores the name of a job step (job step name) executed by the job framework 24; and the job name column 26B stores the name of a job (job name) including the relevant job step.

Moreover, the execution date and time column 26D stores the date and time when the relevant job step was executed; and the open return code column 26E stores the value of the return code obtained by the job cooperation main program 25 (FIG. 1) when executing the relevant job step.

Furthermore, the mainframe cloud return code column 26F is divided into a single step substitution column 26FA and a multiple-step substitution column 26FB. Then, the single step substitution column 26FA stores the value of the return code obtained when the cloud server 5 substituted for the computer 10 and executed the failed job step in accordance with the single step substitution instruction given by the job cooperation main program 25 for the computer 10; and the multiple-step substitution column 26FB stores the value of the return code when the cloud server 5 substituted for the computer 10 and executed each job step of the running job from the first job step to the failed job step in accordance with the multiple-step substitution instruction given by the job cooperation main program 25 for the computer 10.

Therefore, an example of FIG. 6 shows that, for example, a job step called "STEP1" of a job called "JOB1" was executed at "1/1 1:00"; and the value of the return code obtained by the job cooperation main program 25 at that time is "0," that is, the job step was executed successfully.

Moreover, the achievement management table 27: is a table used to manage achievements of the computer 10 with respect to each job of the batch operation; and is composed of a number column 27A, a job name column 27B, a job achievement column 27C, and a number-of-successive-successes column 27D as illustrated in FIG. 7.

Then, the number column 27A stores the serial number assigned to the relevant job from among the serial numbers assigned to the respective jobs registered in the achievement management table 27; and the job name column 27B stores the job name of the relevant job.

Furthermore, the job achievement column 27C stores the achievement ("insufficient" or "sufficient") of the computer 10 with respect to the relevant job; and the number-of-successive-successes column 27D stores the number of times the relevant job is executed successively only by the computer 10. Incidentally, the expression "the job is executed successfully" means that all the job steps in that job are executed successfully.

In a case of this embodiment, the word "insufficient" meaning that the achievement of the relevant job is insufficient is stored as an initial value in the job achievement column 27C; and when the job has been executed successfully by only the computer 10 successively 10 times, it is recognized that the achievement of the computer 10 with respect to that job has become sufficient and the value stored in the job achievement column 27C is updated to "sufficient."

Therefore, an example of FIG. 7 shows that regarding a job called "JOB1", the number of times the job "JOB1" has been executed successively successful is "9 times," so that the achievement of the computer 10 with respect to this job is managed by being recognized as "insufficient" yet; however, regarding a job called "JOB2," the number of times the job "JOB2" has been executed successively successful is "10 times," so that the achievement of the computer with respect to this job is managed by being recognized as already "sufficient."

Furthermore, the substitution management table 28: is a table used to manage the number of times of successive failures of each job step of each job constituting the batch operation and whether or not the relevant job step is a target to be executed by the cloud server 5 serving as the substitute (substitution target); and is composed of a number column 28A, a job name column 28B, a job step name column 28C, a substitution judgment column 28D, and a number-of-successive-substitution-failures column 28E as illustrated in FIG. 8.

Then, the number column 28A stores the serial number assigned to a job step corresponding to the relevant record from among the serial numbers assigned to the respective job steps registered in the substitution management table 28. Furthermore, the job step name column 28C stores all the job step names of the respective job steps constituting the batch operation; and the job name column 28B stores the name of a job which is composed of the relevant job step (job name).

Furthermore, the substitution judgment column 28D stores a judgment result of whether or not the relevant job step is a target (substitution target) job step to be executed by the cloud server 5 serving as the substitute; and the number-of-successive-substitution-failures column 28E stores the number of times of successive failures when the cloud server 5 serves as the substitute and executes the relevant the job step and then successively fails it.

In the case of this embodiment, the substitution judgment column 28D stores "non-target" as an initial value, meaning that the cloud server 5 does not serve as the substitute to execute the relevant job step; and when the computer 10 fails to execute the job step, that job step is recognized as a job step to be executed by the cloud server 5 serving as the substitute and the value stored in the relevant substitution judgment column 28D is updated to "target."

Therefore, an example of FIG. 8 shows that a job step called "STEP3" from among four job steps "STEP1" to "STEP4" of the job "JOB1" is the substitution target of the cloud server 5; and the cloud server 5 has already failed to execute that job step successively "twice."

(2-3) Various Kinds of Processing Relating to Batch Operation Redundantizing Function Next, specific processing content of the job cooperation main program 25 (FIG. 1) and the job cooperation subprogram 54 (FIG. 1) relating to the batch operation redundantizing function will be explained.

(2-3-1) Processing of Job Cooperation Main Program (2-3-1-1) Main Processing of Batch Operation Redundantizing Function The job cooperation main program 25 is activated together with the job framework 24 (FIG. 1) in this information processing system 1; and after the activation, the job cooperation main program 25 secures a communication path to the cloud control program 43 (FIG. 1) for the cloud control server 4 (FIG. 1) and then waits to be evoked by the job framework 24.

Every time one job step is completed, the job framework 24 evokes the job cooperation main program 25 and provides the return code, which is given from the relevant program 34 and indicates whether the job step has been executed successfully or not, to the job cooperation main program 25.

Figure 9:
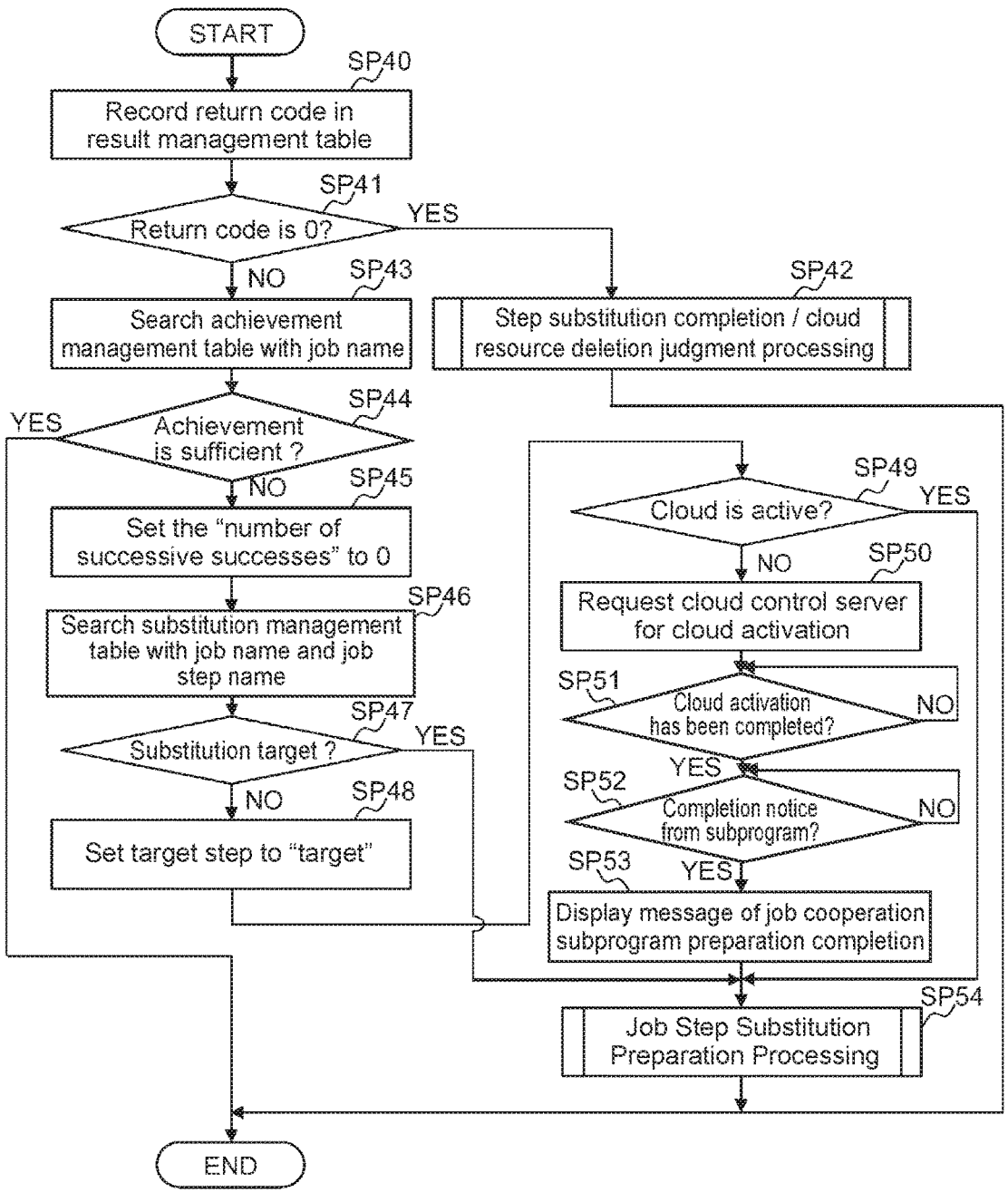
FIG. 9 is a flowchart illustrating a processing sequence for main processing of the batch operation redundantizing function.

Then, when the job cooperation main program 25 is evoked by the job framework 24 and receives the return code, it starts the main processing of the batch operation redundantizing function as illustrated in FIG. 9 and firstly registers the value of the then-received return code in the result management table 26 (FIG. 6) by associating it with the job step which is executed at that time (hereinafter referred to as the "executed job step") and the job including that executed job step (the running job) (SP40).

Specifically speaking, the job cooperation main program 25 secures one used row in the result management table 26, stores the value of the return code in the open return code column 26E in that row, stores the date and time when the job cooperation main program 25 received the return code, in the execution date and time column 26D in that line, stores the job step name of the executed job step in the job step name column 26C in that line, stores the job name of the running job in the job name column 26B in that line, and stores the serial number for the result management table 26 in the number column 26A in that line.

Subsequently, the job cooperation main program 25 refers to the result management table 26 and judges whether the value of the return code registered in the result management table 26 in step SP40 is "0" or not (that is, whether the executed job step was successful or not) (SP41). Then, if the job cooperation main program 25 obtains an affirmative result in this judgment, it executes step substitution completion/cloud resource deletion judgment processing described later with reference to FIG. 10 (SP42) and then terminates this main processing of the batch operation redundantizing function.

On the other hand, if the job cooperation main program 25 obtains a negative result in the judgment of step SP41, it searches records of the achievement management table 27 (FIG. 7) for a record having the job name of the running job stored in the job name column 27B (SP43) and judges whether the value stored in the job achievement column 27C of the record detected by the search is "sufficient" or not (SP44).

Obtaining an affirmative result in this judgment means that the achievement of the computer 10 with respect to the running job has already reached the sufficient number of times. Accordingly, when this happens, the job cooperation main program 25 terminates this main processing of the batch operation redundantizing function. On the other hand, obtaining a negative result in the judgment of step SP44 means that the achievement of the computer 10 with respect to the running job is still insufficient. Accordingly, when this happens, the job cooperation main program 25 updates the value stored in the number-of-successive-successes column 27D of the record detected by the search in step SP43 to "0" (SP45).

Subsequently, the job cooperation main program 25 searches records of the substitution management table 28 for a record with the job step name of the executed job step stored in the job step name column 28C and the job name of the running job stored in the job name column 28B (SP46). Then, the job cooperation main program 25 refers to the substitution judgment column 28D of the record detected by this search and judges whether or not the executed job step is currently a target to be executed by the cloud server 5 serving as the substitute (the substitution target) (SP47).

Then, if the job cooperation main program 25 obtains an affirmative result in this judgment, it executes job step substitution preparation processing described later with reference to FIG. 11 (SP54) and then terminates this main processing of the batch operation redundantizing function.

On the other hand, if the job cooperation main program 25 obtains a negative result in the judgment of step SP47, it sets the executed job step (the failed job step) as the target to be executed by the cloud server 5 serving as the substitute (SP48). Specifically speaking, the job cooperation main program 25 changes the value of the substitution judgment column 28D of the record corresponding to the executed job step in the substitution management table 28 (FIG. 8) to "target."

Under this circumstance, the cloud server 5 needs to be activated in order for the cloud server 5 to serve as the substitute and execute the executed job step (the failed job step) which is set as the target to be executed by the cloud server 5 serving as the substitute in step SP48. Therefore, the job cooperation main program 25 then judges whether the cloud server 5 is currently active or not (SP49). This judgment is made by judging whether "target" is set to the substitution judgment column 28D of any record other than the record corresponding to the executed job step in the substitution management table 28 (FIG. 8).

Then, if the job cooperation main program 25 obtains an affirmative result in this judgment, it executes the job step substitution preparation processing described later with reference to FIG. 11 (SP54) and then terminates this main processing of the batch operation redundantizing function.

On the other hand, if the job cooperation main program 25 obtains a negative result in the judgment of step SP49, it transmits a cloud activation request to the cloud control server 4 (FIG. 1) (SP50).

Accordingly, the cloud control server 4 which has received this cloud activation request applies the power to the cloud server 5 and activates the cloud server 5 and causes the cloud server 5 to read and activate the mainframe OS 33 (FIG. 1) stored in the second area AR2 of the shared volume VOL. Then, when the cloud control server 4 completes the above-described processing, it transmits the aforementioned first completion notice to the computer 10. Furthermore, when the cloud server 5 enters the state capable of substituting for the computer 10 and executing the job step of the batch operation, the job cooperation subprogram 54 for the cloud server 5 transmits the aforementioned second completion notice to the computer 10.

On the other hand, after the processing of step SP50, the job cooperation main program 25 waits to receive the aforementioned first and second completion notices (SP51, SP52); and when the job cooperation main program 25 receives both the first and second completion notices, it causes the display device 23 (FIG. 1) to display a message indicating that the preparation for the job cooperation subprogram 54 has been completed (that is, the activation of the cloud server 5 has been completed) (SP53). Furthermore, the job cooperation main program 25 executes the job step substitution preparation processing described later with reference to FIG. 11 (SP54) and then terminates this main processing of the batch operation redundantizing function.

Figure 10:
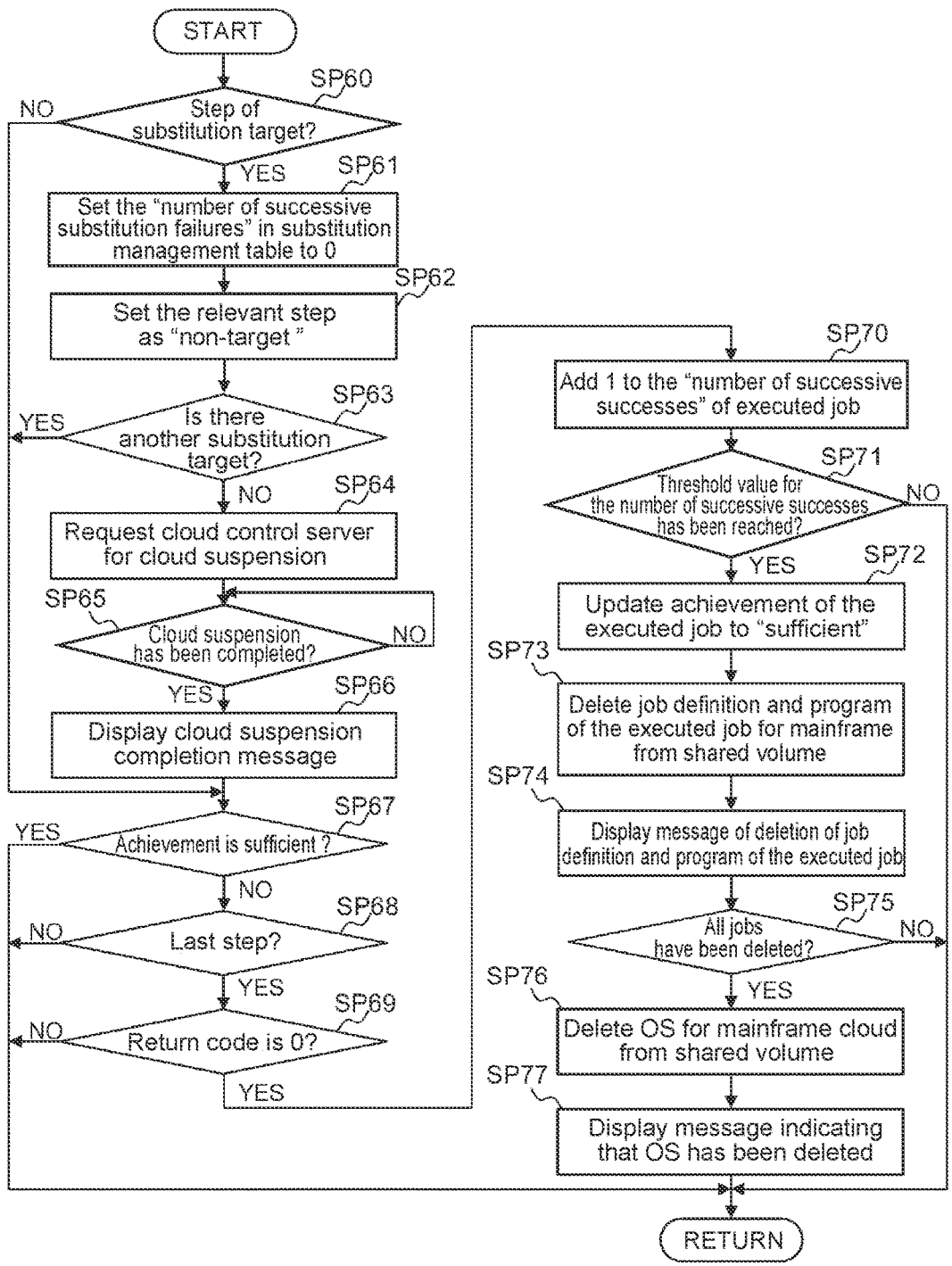
FIG. 10 is a flowchart illustrating a processing sequence for step substitution completion/cloud resource deletion judgment processing.

(2-3-1-2) Step Substitution Completion/Cloud Resource Deletion Judgment Processing FIG. 10 illustrates specific processing content of the step substitution completion/cloud resource deletion judgment processing executed in step SP42 of the aforementioned main processing of the batch operation redundantizing function (FIG. 9). This step substitution completion/cloud resource deletion judgment processing is processing executed by the job cooperation main program 25 when the value of the return code is "0" (that is, when the executed job step was successful) as described above.

When the main processing of the batch operation redundantizing function proceeds to step SP42, the job cooperation main program 25 starts the step substitution completion/ cloud resource deletion judgment processing illustrated in this FIG. 10 and firstly judges whether the executed job step is set as the substitution target of the cloud server 5 or not, based on the value stored in the substitution judgment column 28D of the record corresponding to the executed job step of the substitution management table 28 (SP60). Then, if the job cooperation main program 25 obtains a negative result in this judgment, it proceeds to step SP67.

On the other hand, if the job cooperation main program 25 obtains an affirmative result in the judgment of step SP 60, it updates the number of successive failures stored in the number-of-successive-substitution-failures column 28E of the record of the executed job step in the substitution management table 28 (FIG. 8) to "0" (SP61).

Subsequently, the job cooperation main program 25 sets the executed job step as a non-target job step which should not be executed by the substitute (SP62). Specifically speaking, the job cooperation main program 25 sets the value, which is stored in the substitution judgment column 28D of the record corresponding to the executed job step in the substitution management table 28, to be the "non-target."

Subsequently, the job cooperation main program 25 judges whether there is any job step which is set to be the substitution target of the cloud server 5 among the job steps other than the executed job step, on the basis of the value stored in the substitution judgment column 28D of each record other than the record corresponding to the executed job step of the substitution management table 28 (SP63).

If an affirmative result is obtained in this judgment, the cloud server 5 needs to serve as the substitute and execute the job step of the substitution target and, therefore, the cloud server 5 cannot be suspended. Accordingly, when this happens, the job cooperation main program 25 proceeds to step SP67.

On the other hand, if a negative result is obtained in the judgment of step SP63, there is no job step to be executed by the cloud server 5 serving as the substitute and, therefore, the cloud server 5 can be suspended. Accordingly, when this happens, the job cooperation main program 25 transmits a cloud suspension request to the cloud control server 4 to demand the suspension of the cloud server 5 (SP64). As a result, the cloud control server 4 which has received this cloud suspension request then suspends the activation of the cloud server 5.

Subsequently, the job cooperation main program 25 waits for a notice reporting that the activation of the cloud server 5 has been suspended (hereinafter referred to as the "cloud suspension completion notice"), from the cloud control server 4 (SP65). Then, when the cloud suspension completion notice is transmitted from the cloud control server 4, the job cooperation main program 25 causes the display device 23 (FIG. 1) to display a message indicating that the activation of the cloud server 5 has been suspended (SP66).

Subsequently, the job cooperation main program 25 judges whether the achievement of the computer 10 with respect to the job including the executed job step (the running job) is sufficient or not (SP67). This judgment is made by judging whether the value stored in the job achievement column 27C of the record corresponding to the executed job in the achievement management table 27 (FIG. 7) is "sufficient" or not.

Then, if the job cooperation main program 25 obtains an affirmative result in this judgment, it terminates this step substitution completion/cloud resource deletion judgment processing. On the other hand, if the job cooperation main program 25 obtains a negative result in the judgment of step SP67, it judges whether the executed job step is the last job step of the running job or not (SP68).

If the job cooperation main program 25 obtains a negative result in this judgment, it terminates this step substitution completion/cloud resource deletion judgment processing. On the other hand, if the job cooperation main program 25 obtains an affirmative result in the judgment of step SP68, it refers to the open return code column 26E of each record corresponding to each job step constituting the running job in the result management table 26 (FIG. 6) and judges whether the return codes of all the job steps in the running job are "0" or not (SP69).

If the job cooperation main program 25 obtains a negative result in this judgment, it terminates this step substitution completion/cloud resource deletion judgment processing. On the other hand, if the job cooperation main program 25 obtains an affirmative result in the judgment of step SP69, it adds "1" to the number of successive successes stored in the number-of-successive-successes column 27D of the record corresponding to the executed job in the achievement management table 27 (SP70).

Subsequently, the job cooperation main program 25 judges whether or not the value of the number of successive successes stored in the number-of-successive-successes column 27D of the record corresponding to the running job in the achievement management table 27 (FIG. 7) has reached a preset number of times for the number of successive successes (hereinafter referred to as the "threshold value for the number of successive successes") (SP71).

Under this circumstance, obtaining a negative result in this judgment means that the achievement of the computer 10 with respect to the executed job is still insufficient. Accordingly, when this happens, the job cooperation main program 25 terminates this step substitution completion/cloud resource deletion judgment processing.

On the other hand, obtaining an affirmative result in the judgment of step SP71 means that the execution achievement of the computer 10 with respect to the executed job has reached to the level that can be judged to be sufficient. Accordingly, when this happens, the job cooperation main program 25 updates the value, which is stored in the job achievement column 27C of the record corresponding to the executed job in the achievement management table 27, to "sufficient" (SP72).

Furthermore, the job cooperation main program 25 deletes the program of each job step constituting the executed job, which is stored in the second area AR2 of the shared volume VOL (FIG. 1) formed in the storage apparatus 12 (FIG. 1), from the second area AR2 (SP73) and causes the display device 23 to display a message to that effect (SP74).

Next, the job cooperation main program 25 judges whether or not all the programs of the respective job steps of each job constituting the batch operation have been deleted from the second area AR2 of the shared volume VOL (SP75). Then, if the job cooperation main program 25 obtains a negative result in this judgment, it terminates this step substitution completion/cloud resource deletion judgment processing.

On the other hand, if the job cooperation main program 25 obtains an affirmative result in the judgment of step SP75, it deletes the mainframe OS 33 (FIG. 1), which is stored in the second area AR2 of the shared volume VOL, from that second area AR2 (SP76) and causes the display device 23 to display a message to that effect (SP77). Subsequently, the job cooperation main program 25 terminates this step substitution completion/cloud resource deletion judgment processing and returns to the main processing of the batch operation redundantizing function.

(2-3-1-3) Job Step Substitution Preparation Processing

Figure 11:
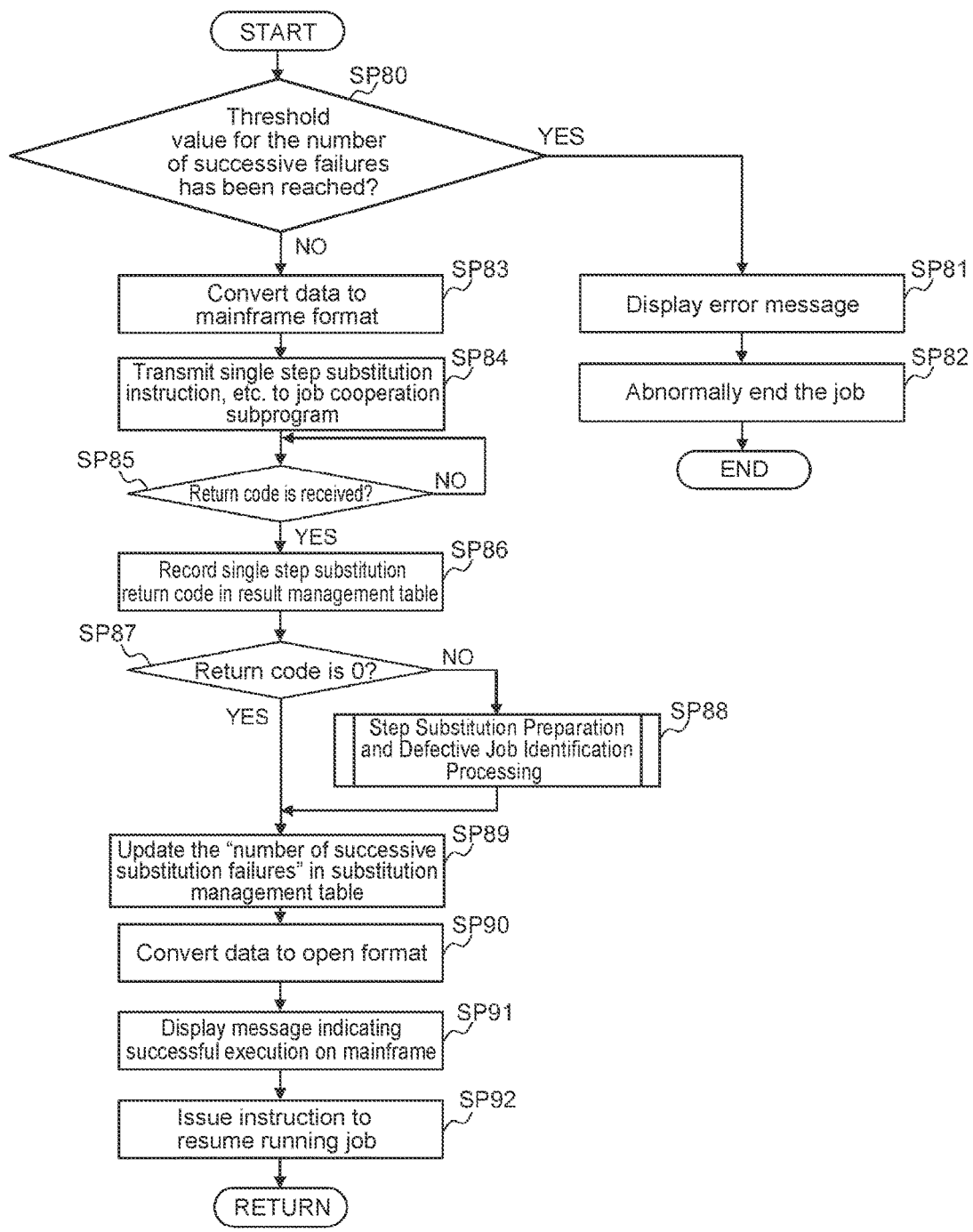
FIG. 11 is a flowchart illustrating a processing sequence for job step substitution preparation processing.

FIG. 11 illustrates specific processing content of the job step substitution preparation processing executed in step SP54 of the aforementioned main processing of the batch operation redundantizing function (FIG. 9). This job step substitution preparation processing is processing for preparing for having the cloud server 5 substitute for the computer 10 and execute the job step which the computer 10 has failed (the failed job step) as described earlier.

When the job cooperation main program 25 proceeds to step SP54 of the main processing of the batch operation redundantizing function, it starts the job step substitution preparation processing illustrated in this FIG. 11 and firstly refers to the number-of-successive-substitution-failures column 28E of the record corresponding to the running job of the substitution management table 28 (FIG. 8) and judges whether or not the cloud server 5 has served as the substitute and has failed to execute the executed job step successively as many times as the aforementioned threshold value for the number of successive cloud failures (3 times in this embodiment) (SP80).

Then, if the job cooperation main program 25 obtains an affirmative result in this judgment, it causes the display device 23 to display an error message reporting that the execution of the executed job step has also been failed by the cloud server 5 successively as many times as the previously defined threshold value for the number of successive cloud failures (SP81). Furthermore, the job cooperation main program 25 abnormally ends the running job (SP82) and then terminates this job step substitution preparation processing. Therefore, in this case, the main processing of the batch operation redundantizing function will also be terminated at this stage.

On the other hand, if the job cooperation main program 25 obtains a negative result in the judgment of step SP80, it converts input data, which is obtained as a result of execution of the failed job step by the computer 10 (that is, output data of a job step immediately before the failed job step), into the mainframe format and stores the converted input data in the second area AR2 of the shared volume VOL (SP83).

Furthermore, the job cooperation main program 25 then transmits the aforementioned single step substitution instruction including the job step name of the failed job step and the job name of the running job to the job cooperation subprogram 54 for the cloud server 5 (SP84).

Accordingly, the job cooperation subprogram 54 which has received this single step substitution instruction delivers the job name and the job step name, which are included in the single step substitution instruction, to the job framework 53 (FIG. 1) and issues an instruction to the job framework 53 to execute the relevant job step (the failed job step). As a result, the job framework 53 executes the program 32 of the failed job step stored in the second area AR2 of the shared volume VOL (FIG. 1). Furthermore, the job cooperation subprogram 54 transfers the return code, which is given from this program 32 and indicates whether the failed job step has been executed successfully or not, to the job cooperation main program 25.

On the other hand, after the processing of step SP84, the job cooperation main program 25 waits for the return code to be transmitted from the job cooperation subprogram 54 (SP85); and when the job cooperation main program 25 eventually receives the return code, it stores the value of the return code in the single step substitution column 26FA of the mainframe cloud return code column 26F in the result management table 26 (FIG. 6) (SP86).

Subsequently, the job cooperation main program 25 judges whether the value of the return code stored in the result management table 26 in step SP86 is "0" or not (SP87). Then, if the job cooperation main program 25 obtains an affirmative result in this judgment, it proceeds to step SP89.

On the other hand, if the job cooperation main program 25 obtains a negative result in the judgment of step SP87, it executes step substitution preparation and defective step identifying processing, which will be described later with reference to FIG. 12, for causing the cloud server 5 to serve as the substitute and execute each job step of the running job from the first job step to the failed job step and identifying the defective job step (SP88).

Subsequently, the job cooperation main program 25 updates the value, which is stored in the number-of-successive-substitution-failures column 28E of the record corresponding to the running job step of the substitution management table 28 (FIG. 8), to "0" (SP89).

Subsequently, the job cooperation main program 25 reads the output data of the failed job step executed by the cloud server 5 according to the single step substitution instruction in step SP84 or as a processing result of the step substitution preparation and defective step identifying processing in step SP88 from the second area AR2 of the shared volume VOL, converts the output data into the open system format, and stores the converted output data of the failed job step at a specified position in the first area AR1 of the shared volume VOL (SP90).

Next, the job cooperation main program 25 causes the display device 23 (FIG. 1) to display a message reporting that the failed job step was abnormally ended by the computer 10, but the cloud server 5 has substituted for the computer 10 and executed the failed job step successfully (SP91).

Furthermore, the job cooperation main program 25 issues an instruction to the job framework 24 (FIG. 1) to resume the running job from the failed job step and subsequent job steps (SP92) and then terminates this job step substitution preparation processing and returns to the main processing of the batch operation redundantizing function in FIG. 9.

Figure 12:
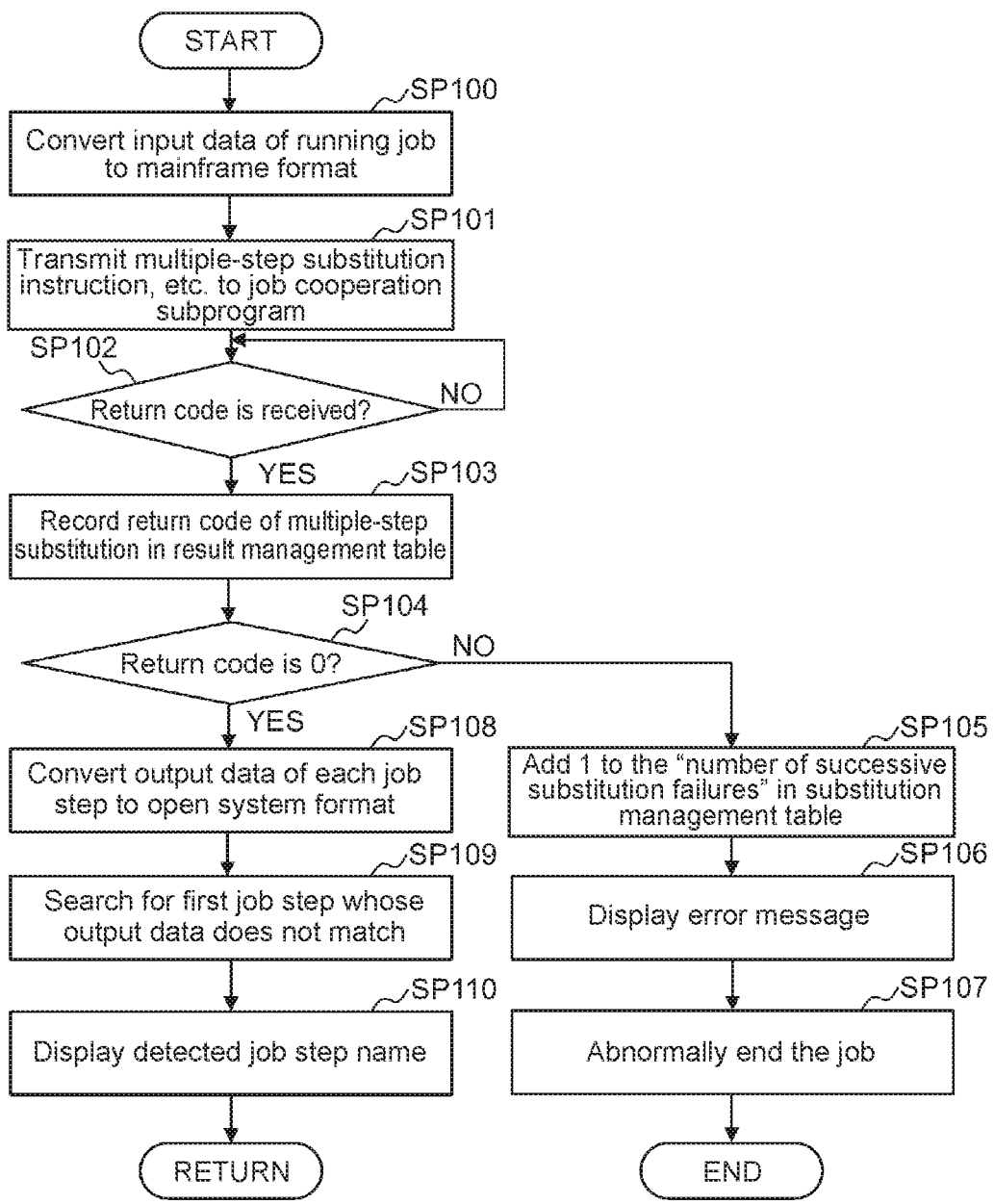
FIG. 12 is a flowchart illustrating a processing sequence for step substitution preparation and defective step identifying processing.

Incidentally, FIG. 12 illustrates specific processing content of the step substitution preparation and defective step identifying processing executed in step SP88 of the aforementioned job step substitution preparation processing (FIG. 11).

When the job cooperation main program 25 proceeds to step SP88 of the job step substitution preparation processing, it starts the step substitution preparation and defective step identifying processing illustrated in this FIG. 12 and firstly converts the input data for the first job step of the running job into the mainframe format and stores it at a specified position of the second area AR2 of the shared volume VOL (SP100).

Subsequently, the job cooperation main program 25 transmits the multiple-step substitution instruction including the job name of the running job and the job step name of the failed job step to the job cooperation subprogram 54 for the cloud server 5 (SP101). Accordingly, the job cooperation subprogram 54 which has received this multiple-step substitution instruction issues an instruction to the job framework 53 to execute each job step of the running job from the first job step to the failed job step and the job framework 53 sequentially executes each job step of the running job from the first job step to the failed job step by executing the relevant programs 32 stored in the second area AR2 of the shared volume VOL in accordance with this instruction. Then, after the job framework 53 has finished executing each job step of the running job from the first job step to the failed job step in this manner, the job cooperation subprogram 54 transmits a return code, which represents whether a series of these job steps has been executed successfully or not, to the job cooperation main program 25 for the computer 10.

When this happens, the job cooperation main program 25 waits for the return code to be transmitted from the job cooperation subprogram 54 after the processing of step SP101 (SP102); and when the job cooperation main program 25 receives this return code, it stores the value of the return code in the multiple-step substitution column 26FB of the mainframe cloud return code column 26F in the result management table 26 (FIG. 6) (SP103).

Subsequently, the job cooperation main program 25 judges whether the value of the turn code stored in the result management table 26 in step SP103 is "0" or not (SP104).

Then, if the job cooperation main program 25 obtains a negative result in this judgment, it updates the value stored in the number-of-successive-substitution-failures column 28E of the substitution management table 28 (FIG. 8) by adding only "1" to that value (SP105) and further causes the display device 23 to display a message reporting that the running job has been abnormally ended by both the computer 10 and the cloud server 5 (SP106).

Furthermore, the job cooperation main program 25 abnormally ends the running job (SP107) and then terminates this step substitution preparation and defective step identifying processing. Therefore, in this case, both the job step substitution preparation processing (FIG. 11) and the main processing of the batch operation redundantizing function (FIG. 9) will be terminated in this stage.

On the other hand, if the job cooperation main program 25 obtains an affirmative result in the judgment of step SP104, it converts the output data, which are stored in the second area AR2 of the shared volume VOL, of the respective job steps of the running job from the first job step to the failed job step then executed by the cloud server 5 into the open system format respectively and stores these pieces of the converted output data respectively at specified positions of the first area AR1 of the shared volume VOL (SP108).

Subsequently, the job cooperation main program 25 compares the output data, which are obtained when the computer 10 executed the respective job steps of the running job from the first job step to the failed job step, with the output data of these job steps which are obtained when the cloud server 5 executed the respective job steps of the running job from the first job step to the failed job step and which are stored in the first area AR1 of the shared volume VOL in step SP108, with respect to each relevant job step in the sequential job step execution order and thereby searches for a job step where the values of these pieces of output data, that is, the execution result of the computer 10 and the execution result of the cloud server 5 do not match each other first (SP109).

Then, the job cooperation main program 25 causes the display device 23 to display the job step name of the job step detected by the search of step SP109 together with a message reporting that the execution result of the computer 10 and the execution result of the cloud server 5 do not match each other (SP110), Subsequently, the job cooperation main program 25 terminates this job step substitution preparation and defective step identifying processing and returns to the job step substitution preparation processing (FIG. 11).

(2-3-2) Processing of Job Cooperation Subprogram

Figure 13:
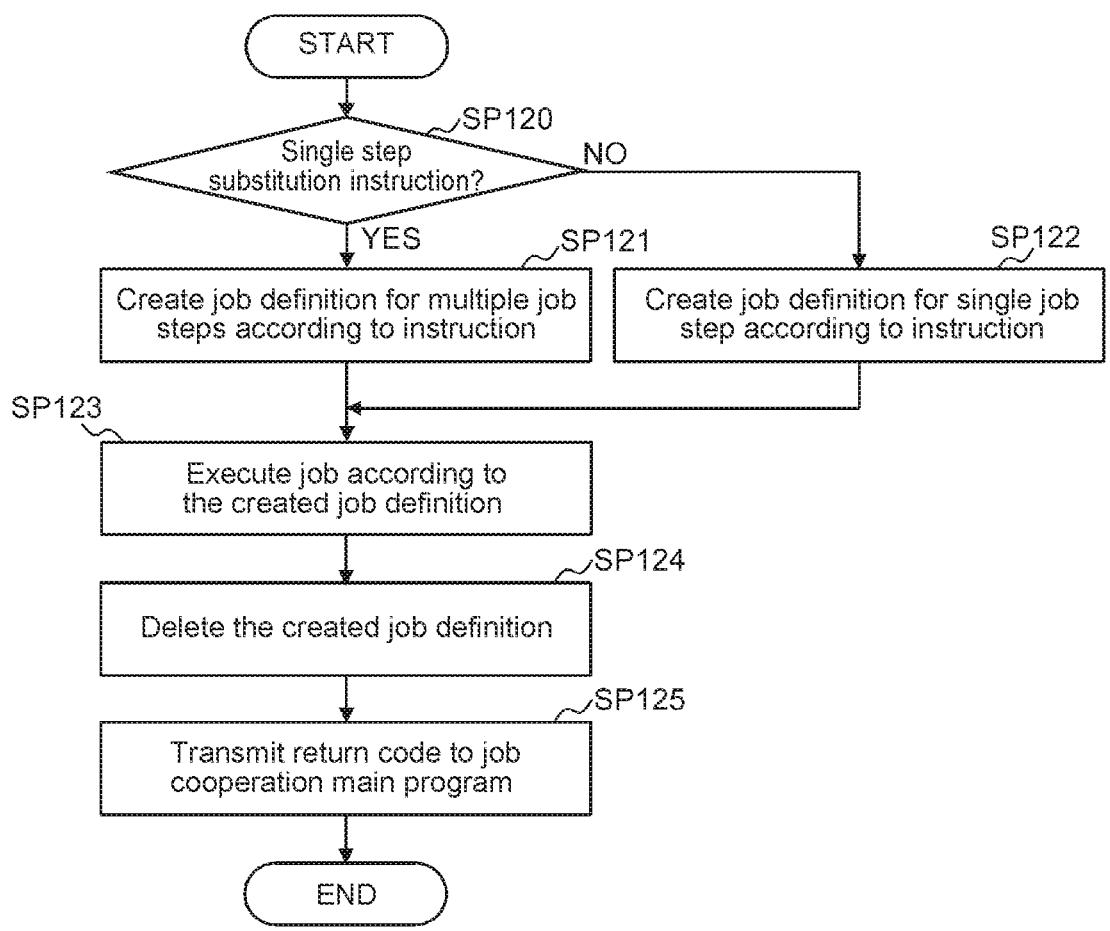
FIG. 13 is a flowchart illustrating a processing sequence for step substitution processing.

On the other hand, FIG. 13 illustrates specific processing content of the step substitution processing executed by the job cooperation subprogram 54 for the cloud server 5 which has received the single step substitution instruction transmitted from the job cooperation main program 25 in step SP84 of the job step substitution preparation processing described above with reference to FIG. 11 or which has received the multiple-step substitution instruction transmitted from the job cooperation main program 25 in step SP101 of the job step substitution preparation and defective step identifying processing described above with reference to FIG. 12.

The job cooperation subprogram 54 is activated together with the job framework 53 (FIG. 1); and after the activation and a communication path to the job cooperation main program 25 for the computer 10 is secured, the job cooperation subprogram 54 waits for the aforementioned single step substitution instruction or multiple-step substitution instruction to be issued from the job cooperation main program 25.

Then, when the job cooperation subprogram 54 receives the single step substitution instruction or the multiple-step substitution instruction transmitted from the job cooperation main program 25, it starts the step substitution processing illustrated in FIG. 13 and judges whether the then-received substitution instruction is the single step substitution instruction or not (SP120).

If the job cooperation subprogram 54 obtains an affirmative result in this judgment, it confirms the job (the running job) and the job step (the failed job step) to be executed by the substitute as designated by the then-received single step substitution instruction, creates a job definition of a new job by taking out the failed job step from the running job (SP121), and then proceeds to step SP123.

On the other hand, if the job cooperation subprogram 54 obtains a negative result in the judgment of step SP120, it confirms the job (the running job) and the job step (the failed job step) to be executed by the substitute as designated by the then-received multiple-step substitution instruction and creates a job definition of a new job by taking out the respective job steps of the running job from the first job step to the failed job step (SP122).

Subsequently, the job cooperation subprogram 54 reads the job definition created in step SP121 or step SP122 and issues an instruction to the job framework 53 to execute the job in accordance with the job definition (SP123).

Accordingly, the job framework 53 which has received this instruction executes the relevant program(s) 32 stored in the second area AR2 of the shared volume VOL and thereby executes the failed job step (when the substitution instruction received by the job cooperation subprogram 54 is the single step substitution instruction) or executes the respective job steps of the running job from the first job step to the failed job step (when the substitution instruction received by the job cooperation subprogram 54 is the multiple-step substitution instruction) and stores the execution result(s) (the output data of each job step) at a specified position(s) of the second area AR2 of the shared volume VOL. Furthermore, the job framework 53 transmits a return code which represents whether each job step given by the relevant the program 32 was successful or not, to the job cooperation subprogram 54.

Subsequently, the job cooperation subprogram 54 deletes the job definition created in step SP121 or step SP122 (SP124) and further transmits the return code, which has been given from the job framework 53 as described above, to the job cooperation main program 25 (SP125), and then terminates this step substitution processing.

(3) Advantageous Effects of this Embodiment

With this information processing system 1 described above, the computer 10 which is composed of the open system and to which the operation has been migrated from the mainframe 13 sequentially executes the job steps of each job of the migrated operation according to the program 34 of each job step which has been changed to the open system format and is stored in the storage apparatus 12; and meanwhile, when the execution of any one of the job steps has failed, the computer 10 issues an instruction to the cloud server 5 to substitute for the computer 10 and execute the relevant job step (the failed job step) and the cloud server 5 serves as the substitute and executes that job step according to the relevant program 32 which is in the mainframe format before the change and is stored in the storage apparatus 12.

Therefore, with this information processing system 1, even when the computer 10 fails to execute a job step of the running job due to any defect or the like of the program 34 which has been changed to the open system format, the cloud server 5 serves as the substitute and executes that job step and, therefore, the operation will not be suspended. As a result, this information processing system 1 can implement the highly-reliable information processing system capable of effectively preventing the operation from being adversely affected by any cause attributable to any defect after the migration of the operation.

Furthermore, with this information processing system 1, when the cloud server 5 also fails to execute the failed job step regarding which it has received the instruction from the computer 10 to substitute for the computer 10 and execute the failed job step, the cloud server 5 executes each job step of the running job from the first job step to the failed job step, so that the information processing system which is more highly reliable and available can be implemented.

Furthermore, with this information processing system 1, when the cloud server 5 also fails to execute the failed job step regarding which it has received the instruction from the computer 10 to substitute for the computer 10 and execute the failed job step, the execution results (output data) of the respective job steps of the running job from the first job step to the failed job step by the computer 10 are compared with the execution results of these respective job steps by the cloud server 5 and a job step which outputs an unreasonable execution result is identified and presented to the user, so that the program 34 which failed in the change can be modified promptly. Therefore, any defect in the computer 10 after the migration of the operation can be improved promptly and the reliability and availability of the business system 2 can be further enhanced accordingly.

Furthermore, with this information processing system 1, when with respect to each step of the operation the computer 10 has successfully executed the job successively as many times as the preset threshold value for the number of successive successes, the mainframe program 32 for each job step of that job is deleted from the shared volume VOL of the storage apparatus 12. So, the availability is secured until the computer 10 makes the sufficient achievement with respect to the job; and after the computer 10 makes the sufficient achievement with respect to the job, the program 32 which is no longer necessary is prevented from remaining in the storage apparatus 12 and it is thereby possible to effectively prevent the storage resource (the storage apparatus 12) from being wasted.

Furthermore, with this information processing system 1, when the computer 10 fails to execute a job step of any one of jobs successively, it activates the cloud server 5 and issues an instruction to the cloud server 5 to substitute for the computer 10 and execute that job step (the failed job step). On the other hand, if the computer 10 later executes the failed job step successfully by, for example, modifying the program 34 for that failed job step, the activation of the cloud server 5 is suspended. So, the cloud server 5 can be activated only when necessary; and it is possible to accordingly achieve the energy conservation of the information processing system 1 as a whole.

(4) Other Embodiments

Incidentally, the aforementioned embodiment has been described about the case where the present invention is applied to the information processing system 1 which is configured as illustrated in FIG. 1; however, the present invention is not limited to this example and can be applied to a wide variety of information processing systems with various other configurations.

Furthermore, the aforementioned embodiment has been described about the case where the present invention is applied to the information processing system regarding which the operation has been migrated from the mainframe to the open system; however, the present invention is not limited to this example and can be also applied to an information processing system regarding with the operation has been migrated between different system environments other those mentioned above.

INDUSTRIAL APPLICABILITY

The present invention can be applied to a wide variety of information processing systems where each of such information processing systems has a second computer to which an operation composed of one or more jobs has been migrated from a first computer of a different system environment.

REFERENCE SIGNS LIST

1: information processing system
2: business system
4: cloud control server
5: cloud server
10: computer
12: storage apparatus
13: mainframe
20, 40, 50: CPU
23: display device
24, 53: job framework
25: job cooperation main program
26: result management table
27: achievement management table
28: substitution management table
32, 34: programs
43: cloud control program
54: job cooperation subprogram
AR1, AR2: areas
VOL: shared volume

The invention claimed is:
1. An information processing system comprising:
a second computer to which an operation composed of one or more jobs has been migrated from a first computer of a different system environment;
a storage apparatus that stores first programs, each of which is for each job step of each of the jobs for executing the operation in the system environment of the first computer, and second programs, each of which is for each job step of each of the jobs and is obtained by changing each of the first programs in accordance with a system environment of the second computer; and
a server apparatus capable of executing the operation in the system environment of the first computer by executing the first program,
wherein the second computer is configured to:
execute each job step of each of the jobs based on each second program stored in the storage apparatus, and
when the second computer fails to execute a respective job step of any one of the jobs, issue a substitution instruction to the server apparatus to substitute for the second computer to execute the respective failed job step, and
wherein the server apparatus is configured to:
when the server apparatus receives, from the second computer, the substitution instruction to substitute for the second computer to execute the respective failed job step, substitute for the second computer and execute the respective job step based on the first program corresponding to the respective failed job step stored in the storage apparatus, and
when the server apparatus fails to execute the respective failed job step based on the first program and corresponding to the substitution instruction, execute each of the job steps of the one of the jobs, which is being executed by the second computer, from a first job step to the respective failed job step designated by the substitution instruction.

2. The information processing system according to claim 1,
wherein the second computer is configured to:
identify and present the respective failed job step which outputs unreasonable data by comparing an execution result of each of the job steps executed by the second computer itself from the first job step to the respective failed job step of the one of the jobs with an execution result of each of the job steps from the first job step to the respective failed job step of the one of the jobs executed by the server apparatus.

3. The information processing system according to claim 1,
wherein, when one of the jobs has been executed successfully a predefined number of times, the second computer is configured to delete the first program corresponding to each of the job steps of the one of the jobs from the storage apparatus.

4. The information processing system according to claim 1,
wherein, when the second computer fails to execute the job step of the one of the jobs, the second computer is configured to activate the server apparatus and issue the substitution instruction to the server apparatus to substitute for the second computer to execute that job step, and
when the second computer successfully executes the job step of the one of the jobs, suspend the activation of the server apparatus.

5. An operation redundantizing method executed by an information processing system,
wherein the information processing system includes:
a second computer to which an operation composed of one or more jobs has been migrated from a first computer of a different system environment;
a storage apparatus that stores first programs, each of which is for each job step of each of the jobs for executing the operation in the system environment of the first computer, and second programs, each of which is for each job step of each of the jobs and is obtained by changing each of the first programs in accordance with a system environment of the second computer; and
a server apparatus capable of executing the operation in the system environment of the first computer by executing the first program,
the operation redundantizing method comprising:
executing, by the second computer, each job step of each of the jobs based on the second programs stored in the storage apparatus;
when the execution of a respective job step of any one of the jobs has failed, issuing a substitution instruction to the server apparatus to substitute for the second computer to execute the respective failed job step;
when the substitution instruction to substitute for the second computer to execute the failed job step is received by the server apparatus, substituting for the second computer and executing, by the storage apparatus, the respective job step based on the first program corresponding to the respective failed job step stored in the storage apparatus; and
when the server apparatus fails to execute the respective failed job step based on the first program and corresponding to the substitution instruction, executing, by the server apparatus, each of the job steps of the one of the jobs, which is being executed by the second computer, from a first job step to the respective failed job step designated by the substitution instruction.

6. The operation redundantizing method according to claim 5, further comprising:
identifying and presenting, by the second computer, the respective failed job step which outputs unreasonable data by comparing an execution result of each of the job steps executed by the second computer itself from the first job step to the respective failed job step of the one of the jobs with an execution result of each of the job steps from the first job step to the respective failed job step of the one of the jobs executed by the server apparatus.

7. The operation redundantizing method according to claim 5, further comprising:
when the one of the jobs has been executed successfully a predefined number of times, deleting, by the second computer, the first program corresponding to each of the job steps of the one of the jobs from the storage apparatus.

8. The operation redundantizing method according to claim 5,
wherein, when the second computer fails to execute the respective job step of the one of the jobs, the second computer activates the server apparatus and issues the substitution instruction to the server apparatus to substitute for the second computer to execute that job step, and
wherein, when the second computer successfully executes that the respective job step, the second computer suspends the activation of the server apparatus.

* * * * *